United States Patent [19]

Nakayama

[11] Patent Number: 5,209,580

[45] Date of Patent: May 11, 1993

[54] BEARING DEVICE FOR A VEHICLE AXLE

[75] Inventor: Katsuhiko Nakayama, Higashiosaka, Japan

[73] Assignee: Koyo Seiko Co., Ltd., Osaka, Japan

[21] Appl. No.: 761,453

[22] Filed: Sep. 18, 1991

[30] Foreign Application Priority Data

Nov. 6, 1990 [JP] Japan .............................. 2-116867[U]

[51] Int. Cl.$^5$ .............................................. F16C 33/30
[52] U.S. Cl. ..................................... 384/448; 384/446
[58] Field of Search ............... 384/448, 446, 569, 571, 384/589

[56] References Cited

U.S. PATENT DOCUMENTS

| 3,949,841 | 4/1976 | Jovick et al. | |
|---|---|---|---|
| 4,865,468 | 9/1989 | Kato et al. | |
| 4,960,333 | 10/1990 | Faye et al. | |
| 4,988,220 | 1/1991 | Christiansen et al. | 384/448 |
| 5,080,500 | 1/1992 | Hilby et al. | 384/448 |

FOREIGN PATENT DOCUMENTS 62-249069 10/1987 Japan .

Primary Examiner—Lenard A. Footland
Attorney, Agent, or Firm—Wenderoth, Lind & Ponack

[57] ABSTRACT

A bearing device for a vehicle axle has an outer ring, two connected inner rings and rollers. The outer ring has a mounting flange at the middle in the axial direction on an outside circumference surface thereof and a stepped hole open radially at approximately the middle in the axial direction thereof. A pulser ring is mounted at the middle in the axial direction of the two connected inner rings o outside circumference surfaces of the two connected inner rings. A rotation sensor has a detecting member and a mounting member vertical to the detecting member. The detecting member consists of a small end portion and a large middle portion. The detecting member is inserted in the stepped hole, so that the end portion opposes the pulser ring. A face of the mounting member on a chassis bearing installation member side is positioned near the center line of the middle portion.

5 Claims, 4 Drawing Sheets

BEARING DEVICE FOR A VEHICLE AXLE

BACKGROUND OF THE INVENTION

The present invention relates to a bearing device for a vehicle axle characterized by an improved mounting structure for a rotation sensor.

As shown in FIGS. 7 and 8, a conventional bearing device for a vehicle axle has rolling elements 6 arrayed between an outer ring 2 and inner rings 5, through which passes an axle 3 and on which is mounted a pulser ring 4. A detecting member 7a of a rotation sensor 7 is inserted into an insertion hole 2a provided radially in the outer ring 2 so that the end of the detecting member 7a opposes the pulser ring 4, and a mounting member 9 of the rotation sensor 7 is secured to the outside surface of the outer ring 2 by bolts 8. The outer ring 2 is fitted in the fitting hole 1a in the bearing mounting member i.e. knuckle 1 on the chassis, and a mounting flange 2b of the outer ring 2 is fixed to a face 1b of the knuckle 1 by bolts (not shown in the figures).

By detecting a rotational velocity of the axle 3 by means of the rotation sensor 7 and the pulser ring 4, an antilock brake control system can be provided in the vehicle.

It is to be noted that there is a terminal box 7c fixed to the mounting member 9.

However, because the axle bearing device as thus described has a mounting flange 2b at approximately the middle in the axial direction on the outside surface of the outer ring 2 and the insertion hole 2a opens in the radial direction at approximately the middle in the axial direction on the outside surface of the outer ring 2, when the outer ring 2 mounting flange 2b is fixed to the end face 1b of the knuckle 1, the center line "c" of the insertion hole 2a is positioned near the end face 1b of the knuckle 1. As a result, the face 9a on the knuckle 1 side of the mounting member 9 of the rotation sensor 7 interferes by dimension "S" with the end face 1b of the knuckle 1, making it impossible in practice to secure the mounting member 9 of the rotation sensor 7 to the outer ring 2.

This problem can be resolved by, for example, shifting the face 1b of the knuckle 1 in the axial direction by an amount equal to dimension S to prevent this interference. However, there are cases in which the position of the face 1b cannot be shifted due to the construction of the knuckle 1.

Another way to avoid this interference is to make the mounting member 9 and the detecting member 7a smaller so there is no interference with the face 1b of the knuckle 1. However, this requires the diameter "d" of the detecting member 7a to be made extremely small, decreasing the detection performance of the rotation sensor.

Furthermore, another method is to offset the face 9a of the mounting member 9 by dimension "S" in the axial direction to the detecting member 7a in the direction away from the end face 1b of the knuckle 1 to prevent any interference. However with this method the overlap of the detecting member 7a and the mounting member 9 is width "W", becoming narrower, and the connection of the detecting member 7a and the mounting member 9 is thus weakened.

SUMMARY OF THE INVENTION

Therefore, an object of the present invention is to provide a bearing device for a vehicle axle having a strong connecting between a detecting member and a mounting member which does not require the position of the mounting flange of an outer ring to be shifted or the size of the rotation sensor to be decreased and still maintains a sufficient overlap between the detecting member and the mounting member.

In order to attain the above object, a bearing device for a vehicle axle of the present invention comprises an outer ring having a mounting flange at approximately the middle in the axial direction of the outer ring on an outside circumference surface of the outer ring, and a stepped hole open radially at approximately the middle in the axial direction, said stepped hole consisting of a small diameter portion and a large diameter portion;

an inner ring means through which an axle passes;

a pulser ring which is mounted at approximately the middle in the axial direction of the inner ring means on an outside circumference surface of the inner ring means;

rolling elements positioned between the outer ring and the inner ring means; and a rotation sensor comprising a detecting member inserted in the stepped hole in the outer ring and a mounting member orthogonally extending from the detecting member and secured to an outside surface of the outer ring;

said detecting member having an end portion opposite the pulser ring and inserted in the small diameter portion and a middle portion contiguous to both the end portion and the mounting member, having a diameter greater than that of the end portion, and inserted in the larger diameter portion, and the face of the mounting member on a chassis bearing installation member side being positioned near the center line of the middle portion.

The end and middle portions of the detecting member of the rotation sensor can be positioned on the same axis.

Alternatively, the center line of the middle portion can be offset with respect to the center line of the end portion of the detecting member towards the mounting member side.

In addition, it is preferable to form a concavity on the top of the middle portion of the rotation sensor on a side not contiguous to the mounting member.

The bearing device functions as follows. The detecting member of the rotation sensor is inserted into the stepped hole in the outer ring, and the mounting member is secured to the outside face of the outer ring. Then, the outer ring is set into a fitting hole in the bearing installation member on the chassis, and the mounting flange is secured to the end face of the bearing mounting member.

At this time because the end of the mounting member on the bearing installation member side is positioned near the center line of the middle portion of the detecting member of the rotation sensor, the end of the mounting member does not interfere with the end of the bearing installation member.

Furthermore, because the diameter of the middle portion of the detecting member of the rotation sensor is large, the overlap of the detecting member and the mounting member increases.

Also, when the end and middle portions are on the same axis, processing is easier, and when offset, the width of the continuing area between the mounting member and the middle portion of the detecting member is greater.

Moreover, if a concavity is formed on the top of the middle portion of the detecting member on the side not continuous to the mounting member, the top surface of the middle portion of the detecting member does not interfere with the inside circumference surface of the fitting hole in the bearing installation member.

BRIEF DESCRIPTION OF THE DRAWINGS

The present invention will become more fully understood from the detailed description given hereinbelow and the accompanying drawings which are given by the way of illustration only, and thus are not limitative of the present invention, and wherein.

DETAILED DESCRIPTION OF THE PREFERRED EMBODIMENTS

Figure 1:
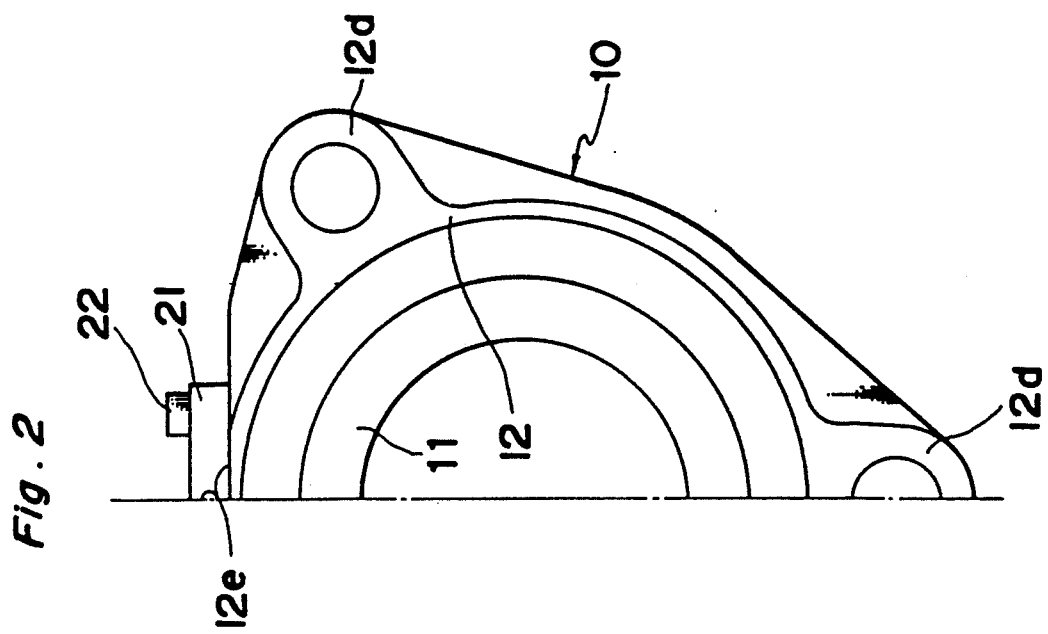
FIG. 1 is a sectional view of a bearing device for a vehicle axle according to a first embodiment of the present invention.

Before the description of the present invention proceeds, it is to be noted that like parts are designated by like reference numerals throughout the accompanying drawings.

Figure 2:
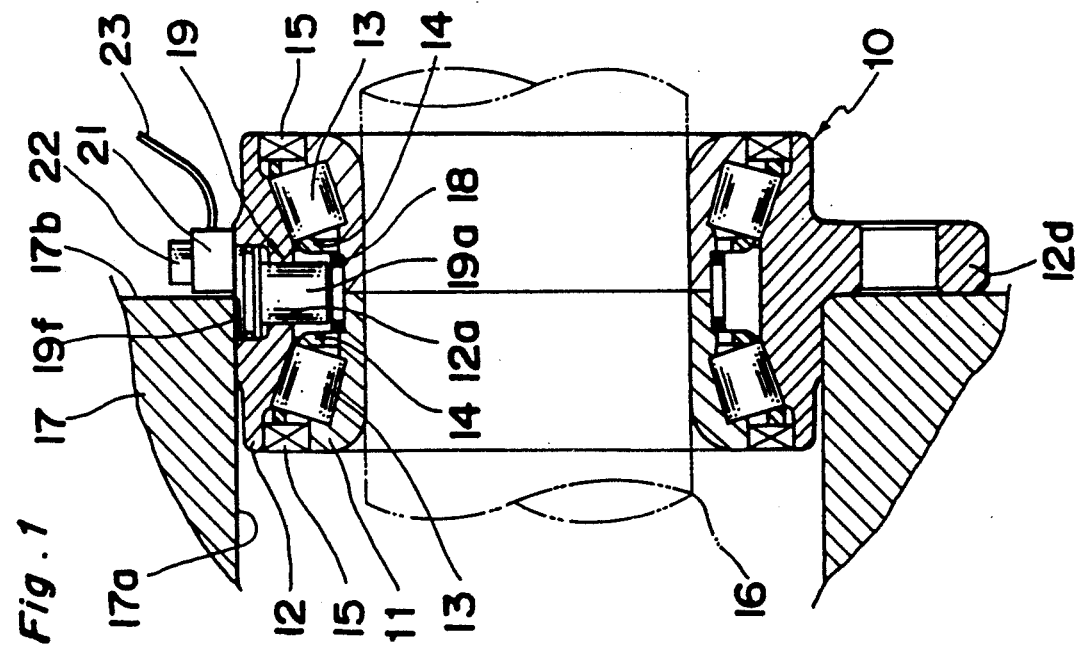
FIG. 2 is a front view of the bearing device in FIG. 1.

As shown in FIGS. 1 and 2, a hub unit for a vehicle wheel i.e. bearing device 10 for a vehicle axle in the first embodiment of the present invention has plural rows of rollers (rolling elements) 13 between connected inner rings 11 and an outer ring 12. The rollers 13 are held by retainers 14, and the area in which the rollers 13 are present is sealed by oil seals 15. The inside circumferences of the inner rings 11 are fitted on an axle 16.

Three mounting flanges 12d are provided at equidistant positions around the outside circumference of the outer ring 12 at approximately the middle in the axial direction.

Figure 3:
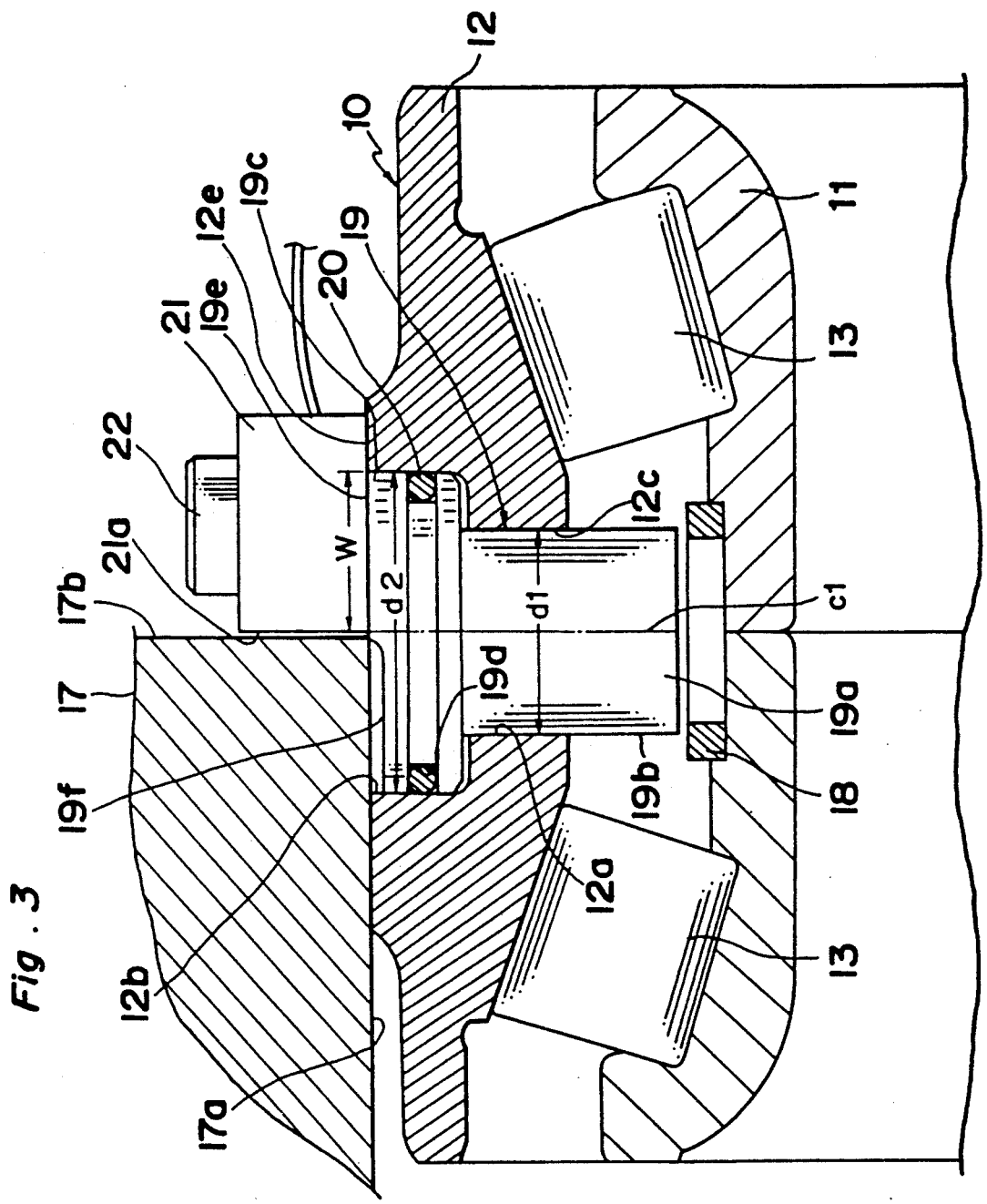
FIG. 3 is an enlarged sectional view of the essential elements in FIG. 1.

As shown in detail in FIG. 3 (wherein the retainers 14 and oil seals 15 are omitted), there is a stepped hole 12a passing radially through the outer ring 12 at approximately the middle in the axial direction of the outside surface of the outer ring 12. The stepped hole 12a consists of a large diameter portion 12b on the outside circumference end, and a small diameter portion 12c on the inside circumference end. Both the large diameter portion 12b and the small diameter portion 12c are concentric to center line "c1".

The outer ring 12 is fitted from the axial direction into the fitting hole 17a provided in a bearing installation member, i.e. knuckle 17, on a chassis side until the mounting flanges 12d (see FIG. 2) contact the end face 17b of the knuckle 17, and is fixed by bolts (not shown in the figures) to the end face 17b of the knuckle 17.

A pulser ring 18 made of magnetic materials is mounted at a position between the rollers 13 on the outside circumferences of the inner rings 11 at approximately the middle in the axial direction of the connected inner rings 11.

The rotation sensor 19 consists of a detecting member 19a and a mounting member 21 orthogonally extending to this detecting member 19a, and the detecting member 19a is inserted to the stepped hole 12a in the outer ring 12 from the outside circumference side of the outer ring 12.

The detecting member 19a consists of a small diameter end portion 19b on the pulser ring 18 end and a large diameter middle portion 19c on the mounting member 21 side; the center lines "c1" of the end portion 19b and the middle portion 19c are on the same axis, the diameter "d1" of the end portion 19b is set to enable the end portion 19b to be inserted in the small diameter portion 12c of the stepped hole 12a, and the diameter "d2" of the middle portion 19c is set to enable the middle portion 19c to be inserted into the large diameter portion 12b of the stepped hole 12a.

Figure 7:
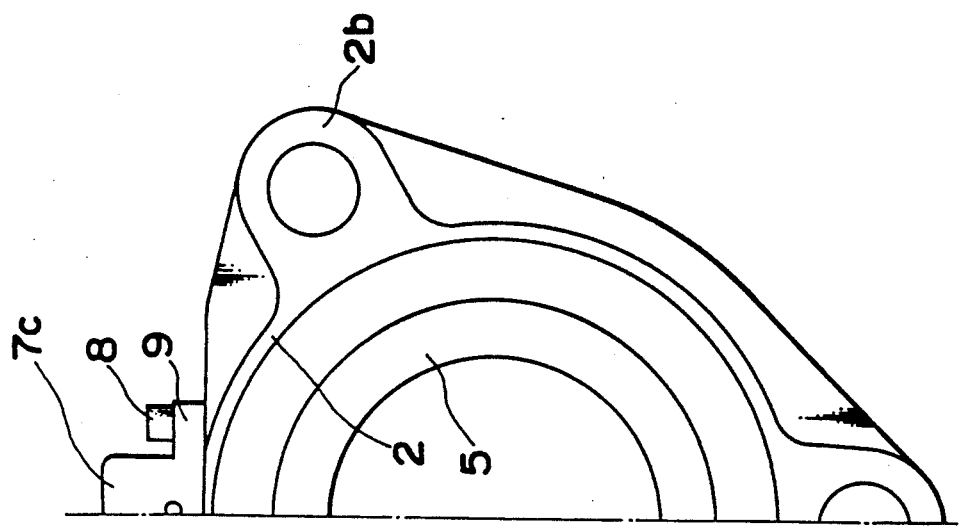
FIG. 7 is a sectional view of a conventional bearing device.
Figure 8:
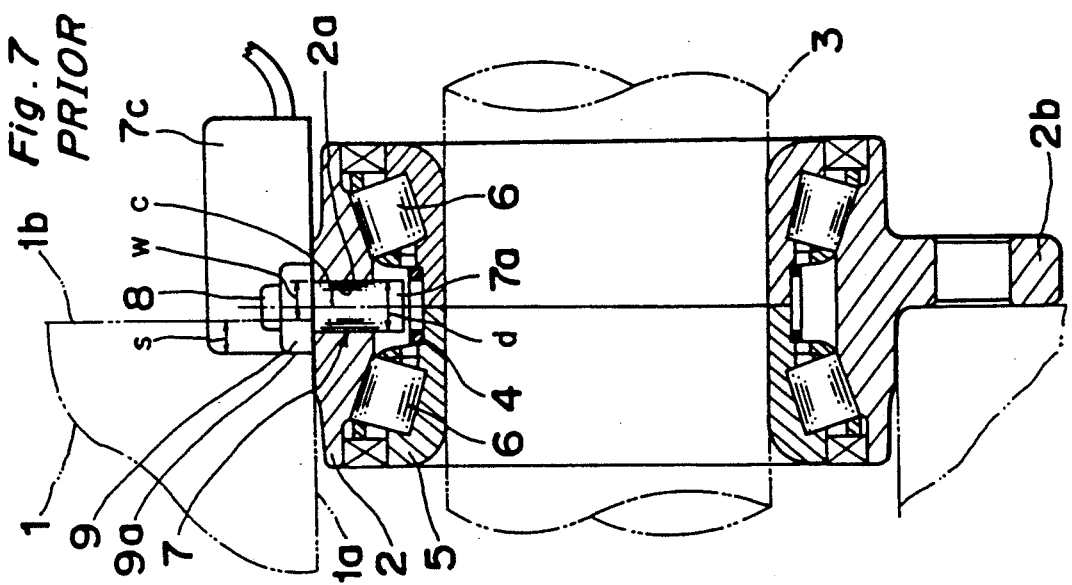
FIG. 8 is a front view of the bearing device in FIG. 7.

In the detecting member 19a are housed a magnetic resistance element and a permanent magnet as not shown in figures, and the tip of the end portion 19b opposes the pulser ring 18 with a predetermined gap therebetween. It is to be noted that the diameter "d1" of the end portion 19b of the detecting member 19a is approximately equal to the diameter "d" of the conventional detecting member 7a shown in FIGS. 7 and 8.

An annular channel 19d is provided in the outside circumference surface of the middle portion 19c of the detecting member 19a, and an O-ring 20 is fitted into this annular channel 19d to seal the gap to the large diameter portion 12b of the stepped hole 12a.

The mounting member 21 of the rotating sensor 19 is placed over one side of the top of the middle portion 19c of the detecting member 19a, specifically over a semicircular top surface 19e, so that the face 21a on the knuckle 17 side of the mounting member 21 is near the center line "c" of the middle portion 19c, and the mounting member 21 is secured by bolts 22 to the flat outside surface 12e of the outer ring 12.

The lead wire 23 of the rotation sensor 19 is conducted to the outside through the inside of the mounting member 21.

In addition, a shallow stepped concavity 19f is formed on the top of the middle portion 19c of the detecting member 19a of the rotation sensor 19 on the side which is not contiguous to the mounting member 21.

A bearing device constructed as described hereinabove comprises a pulser ring 18, rollers 13, retainers 14, and oil seals 15 between an outer ring 12 and inner rings 11 with the detecting member 19a of the rotation sensor 19 inserted to a stepped hole 12a in the outer ring 12 and the mounting member 21 fixed by bolts 22 to the outside surface 12e of the outer ring 12.

The outside circumference surface of the outer ring 12 is fitted into the fitting hole 17a in the knuckle 17, the mounting flanges 12d of the outer ring 12 are set against the end face 17b of the knuckle 17, and the mounting flanges 12d are fixed by bolts thereto.

Then, because the face 21a of the mounting member 21 on the knuckle 17 side is positioned near the center line "c1" of the middle portion 19c of the detecting member 19a of the rotation sensor 19, the face 21a of the mounting member 21 does not interfere with the end face 17b of the knuckle 17.

Furthermore, because the diameter of the middle portion 19c of the detecting member 19a of the rotation sensor 19 is larger than that of the end portion 19b, the width "W" of the area contiguous between the middle portion 19c and the mounting member 21 is greater, and the connecting portion of the detecting member 19a and the mounting member 21 are stronger.

Furthermore, because the middle portion 19c and the end portion 19b of the detecting member 19a of the rotation sensor 19 are concentric, it is easy to process the detecting member 19a and the stepped hole 12a.

In addition, because there is a stepped concavity 19f on the top of the middle portion 19c of the detecting member 19a of the rotation sensor 19, the top of the middle portion 19c of the detecting member 19a does not interfere with the inside circumference surface of the fitting hole 17a, and fitting the outer ring 12 into the fitting hole 17a can be completed more smoothly.

Figure 4:
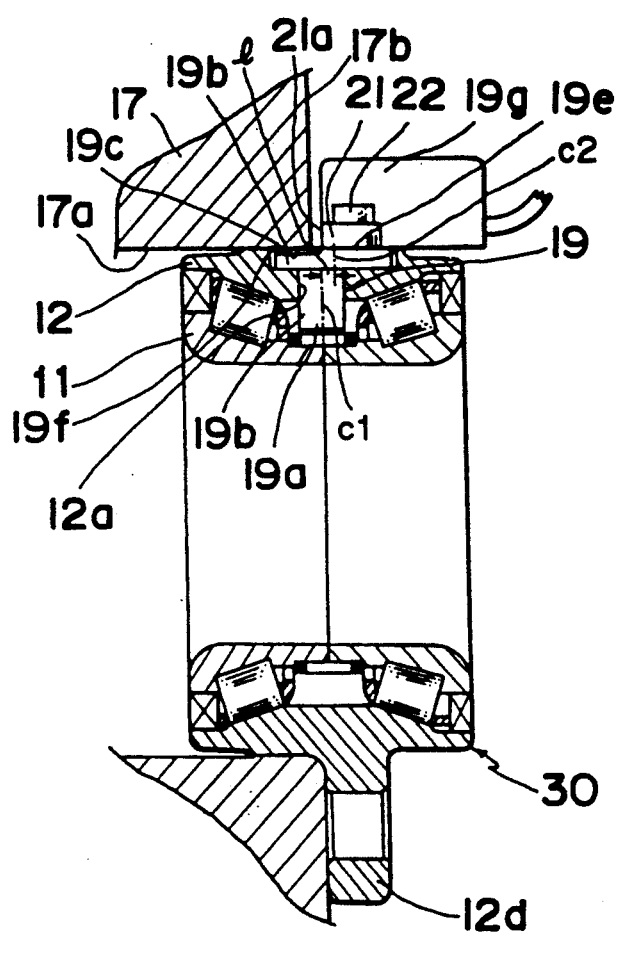
FIG. 4 is a sectional view of a bearing device for a vehicle axle according to a second embodiment of the present invention.
Figure 5:
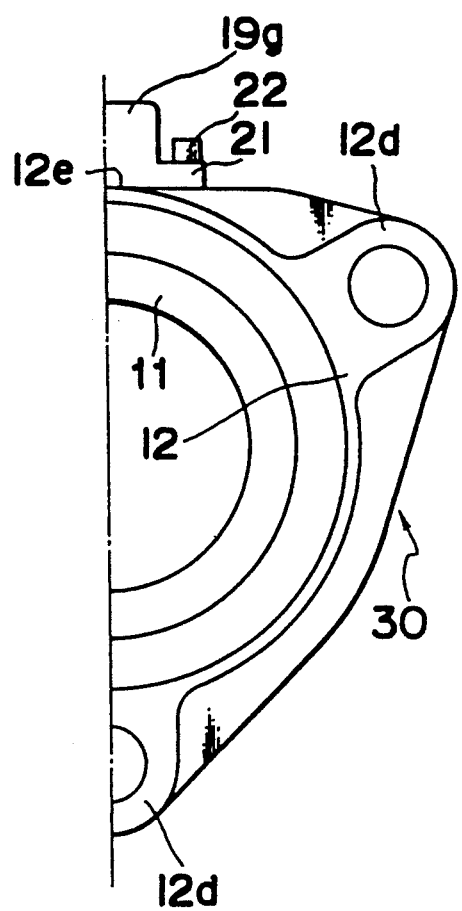
FIG. 5 is a front view of the bearing device in FIG. 4.

A hub unit 30 for a vehicle wheel according to a second embodiment of the present invention is shown in FIGS. 4 and 5 wherein parts and assemblies which are identical to those in the first embodiment described hereinabove ar identified by like reference numerals and further description thereof is hereinbelow omitted.

In this second embodiment, the center line "c2" of the middle portion 19c is offset from the center line "c1" of the end portion 19b of the detecting member 19a of the rotation sensor 19 towards the side on which the mounting member 21 is present by a distance "l".

The mounting member 21 is positioned on the semicircular top surface 19e of the middle portion 19c so that the face 21a on the knuckle 17 side is positioned near the center line "c2" of the offset middle portion 19c, and the mounting member 21 is secured to the flat outside surface 12e of the outer ring 12 by bolts 22.

A terminal box 19g of the rotation sensor 19 is mounted on the mounting member 21.

In this second embodiment, too, because the end face 21a of the mounting member 21 on the knuckle 17 side is positioned near the center line "c2" of the middle portion 19c of the detecting member 19a, the end face 21a of the mounting member 21 does not interfere with the end face 17b of the knuckle 17.

Furthermore, because the diameter of the middle portion 19c of the detecting member 19a of the rotation sensor 19 is larger than that of the end portion 19b and the middle portion 19c is offset, the width of the overlapping area between the middle portion 19c and the mounting member 21 is even greater than that in the first embodiment, and the connection of the detecting member 19a to the mounting member 21 is even stronger.

Figure 6:
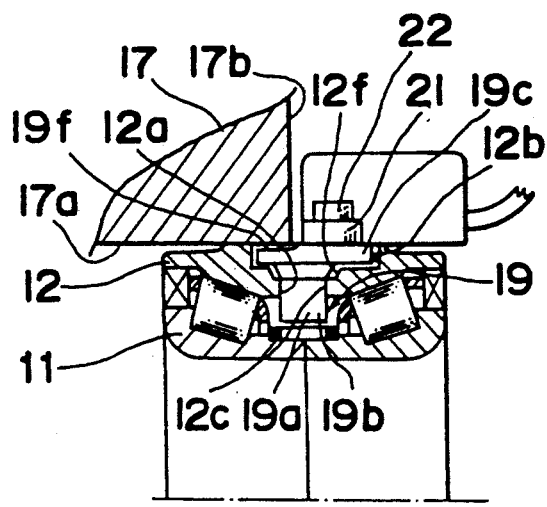
FIG. 6 is a sectional view of a bearing device for a vehicle axle according to a third embodiment of the present invention.

Shown in FIG. 6 is a third embodiment, which differs from the second embodiment described above in that the contiguous portion between the end portion 19b and the middle portion 19c of the detecting member 19a of the rotation sensor 19 is tapered, and a tapered seat 12f is provided between the large diameter portion 12b and the small diameter portion 12c of the stepped hole 12a.

Thus, insertion of the detecting member 19a of the rotation sensor 19 into the stepped hole 12a of the outer ring 12 can be completed more easily.

In addition, each of the above embodiments has the two inner rings. But, it is to be noted that the two inner rings can be replaced with only one inner ring.

As will be seen from the above descriptions of the preferred embodiments, the middle portion of the detecting member of the rotation sensor inserted into the stepped hole in the outer ring has a larger diameter than the end portion of the detecting member, and the end face of the mounting member connecting to this middle portion on the bearing installation member side is positioned near the center line of the middle portion of the detecting member in a bearing device according to the present invention.

Therefore, because the end face of the mounting member does not interfere with the face of the bearing installation member on the chassis side, it is not necessary to offset the position of the mounting flange of the outer ring in the axial direction or to decrease the diameter of the detecting member of the rotation sensor as with conventional methods of avoiding structural interference.

Furthermore, because the diameter of the middle portion of the detecting member of the rotation sensor is larger than that of the end portion, the overlap between the detecting member and the mounting member is wider and this overlapping member is stronger.

Moreover, processing of the stepped hole is easier if the end and middle portions of the detecting member of the rotation sensor are concentrically positioned.

Furthermore, if the center line of the middle portion is offset with respect to the center line of the end portion of the detecting member of the rotation sensor toward the side on which the mounting member is present, the width of the contiguous portion between the mounting member and the middle portion of the detecting member of the rotation sensor is even greater, and this portion is even stronger.

In addition, if a concavity is formed in the top of the middle portion of the detecting member of the rotation sensor, the top surface of the middle portion of the detecting member does not interfere with the inside circumference of the fitting hole in the bearing installation member, and assembly of the outer ring into the fitting hole can be completed smoothly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bearing device for a vehicle axle, comprising:
   an outer ring having at least one flange at approximately the middle in the axial direction of said outer ring on an outside circumferential surface of the outer ring and with a mounting face facing in a first axial direction and adapted to abut a corresponding mounting face on a support, and a detecting member receiving hole extending radially at approximately the middle in the axial direction at a position circumferentially spaced around said outer ring from said mounting flange;
   an inner ring means having a center opening through which an axle passes;
   a pulser ring mounted at approximately the middle in the axial direction of the inner ring means on an outside circumferential surface of the inner ring means;
   rolling elements positioned between the outer ring and the inner ring means; and a rotation sensor consituted by a detecting member inserted in the hole in the outer ring and a mounting member orthogonally extending from the detecting member in a direction opposite said first axial direction and secured to the outside surface of said outer ring;

the face of the mounting member facing in the first axial direction being spaced slightly in said direction opposite said first axial direction from said mounting face of said flange.

2. A bearing device as claimed in claim 1 in which said detecting member receiving hole is a stepped hole having a radially inward small diameter portion and a radially outward larger diameter portion, said detecting member having an end portion opposite the pulser ring and inserted in the small diameter portion and a middle portion between the end portion and the mounting member, having a diameter greater than that of the end portion and inserted int he larger diameter portion.

3. A bearing device for a vehicle axle according to claim 2 wherein the center line of the middle portion is offset from the center line of the end portion of the detecting member of the rotation sensor towards a side on which the mounting member is present.

4. A bearing device for a vehicle axle according to claim 2 further having a concavity formed on the top of the middle portion of the rotation sensor on a side which is not contiguous to the mounting member.

5. A bearing device for a vehicle axle according to claim 2 wherein the end and middle portions of the detecting member of the rotation sensor are positioned concentrically.

* * * * *